Oct. 18, 1932.  F. SAWFORD  1,882,962
APPARATUS FOR MEASURING THE THICKNESS OF PAPER
Filed Nov. 19, 1928
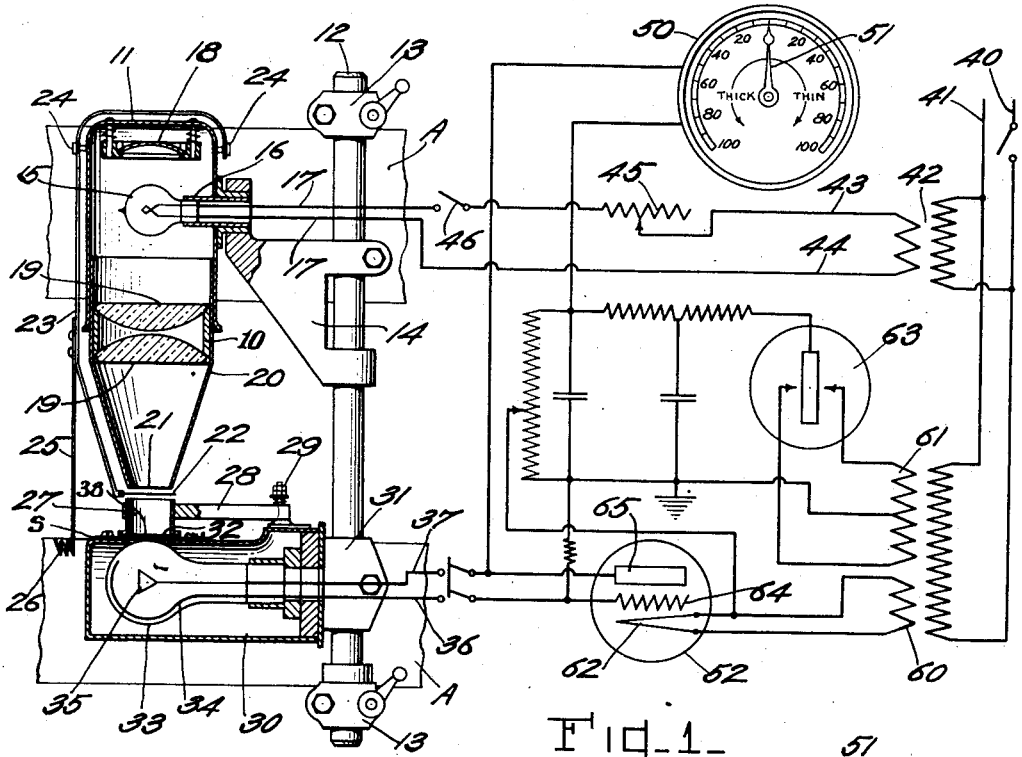
Fig-1-
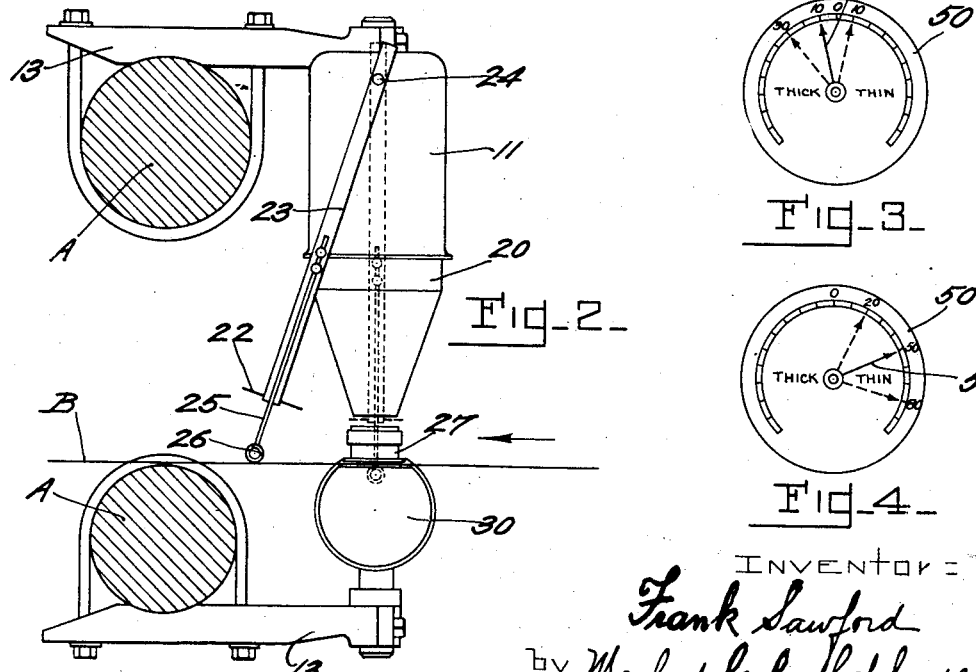
Fig-2-
Fig-3-
Fig-4-
INVENTOR
Frank Sawford
by Macleod Calver Copeland Dike
Attys Patented Oct. 18, 1932

1,882,962

UNITED STATES PATENT OFFICE

FRANK SAWFORD, OF VANCOUVER, BRITISH COLUMBIA, CANADA, ASSIGNOR OF ONE-HALF TO FRANK SAWFORD, JR., OF VANCOUVER, BRITISH COLUMBIA, CANADA

APPARATUS FOR MEASURING THE THICKNESS OF PAPER

Application filed November 19, 1928. Serial No. 320,386.

My invention relates to an apparatus for measuring variations in the thickness of paper particularly as it emerges from the paper making machine. The object of the invention is to provide a method and apparatus which will give to the operator of the paper machine knowledge of any variations in the true average thickness of the paper which the machine is producing in time to permit him to make necessary adjustments or changes before large quantities of imperfect or undesirable stock have been produced. This is a matter of great importance to the paper mills, particularly those making thin papers at high speeds.

Heretofore, it has been common practice in measuring the thickness of paper to tear out a piece from the web as it leaves the machine, fold it to obtain a predetermined number of thicknesses, then punch out a standard area and weigh the punching. This procedure takes considerable time and by the time it has been completed, the machine has produced a large amount of defective stock.

Various attempts have been made to measure variations in the thickness of paper but I am informed that none of these have proved successful in practical use.

Perhaps the chief difficulty in measuring paper under the conditions mentioned has been the fact that paper always presents many minor variations in thickness over small areas and these minor variations have been greater than the allowable difference in the average thickness. This will best be understood from an illustration. For instance in the manufacture of a thin paper which weighs 12 pounds to the ream, the allowable minimum weight per ream may be 11½ and the allowable maximum weight 12½ pounds but this paper may have variations in thickness over small areas which are greater than the differences which will produce the variation in true average thickness mentioned above. It results that instruments adapted to measure the thickness of paper as it progresses through the machine are more affected by the minor variations than they are by changes in the true average thickness and the changes in true average thickness are not observable being covered up by the minor variations. For these reasons the continuous instantaneous measurement of paper as it passes through the machine has presented a problem which has heretofore seemed practically insuperable.

The apparatus shown and described herein consists in general in projecting a beam of light normal to the paper, measuring the amount of light which passes through the paper by means of a photo-electric cell in an amplified circuit containing a meter. Minor variations in the thickness or density of the paper produce minor movements of the needle on each side of a mid-position, while changes in the average thickness are shown by changes of the mid-position of the needle from an established zero position which indicates the true average thickness.

My invention therefore provides an apparatus for measuring the thickness of paper as it progresses through the machine which is not vitiated by the minor variations in thickness but which will give to the operator a continuous measurement of the true average thickness of the paper at any given instant.

The machine embodying my invention is simple and effective and can be applied to ordinary paper machines without modification and when so applied does not interfere in any way with the ordinary operation of the machine particularly in case of breakage of the paper.

The invention will be more fully understood from the following description when taken in connection with the accompanying drawing and the novel features thereof will be pointed out and clearly defined in the claims at the close of this specification.

Fig. 1 is a vertical section of an apparatus embodying my invention, the electrical parts being shown diagrammatically.

Fig. 2 is a side elevation of the optical unit of the apparatus.

Figs. 3 and 4 are diagrams illustrating the operation of the meter.

Referring now to the drawing, the apparatus consists essentially of an electrical unit which is shown in diagram at the right hand side of Fig. 1 and an optical unit which is shown at the left hand side. The optical unit includes a casing 11 carried by a bracket 14 which is itself pivotally supported on a vertical post 12 secured by brackets 13 to some fixed portion, as, for instance, the rods A—A of the paper machine. The post 12 is located adjacent the side edge of the web of paper B as it passes out of the paper machine. This construction is such that the optical unit may be swung into or out of position over the web of paper quickly and easily. In the telescopic casing 11 is an electric lamp 15 secured in place in a lamp socket 16, the lead wires 17—17 being soldered to the terminals of the lamp so that there can be no variation in the resistance of the circuit which otherwise might produce variations in the intensity of the light produced by the lamp. Above the lamp is located a condensing mirror 18 and below the lamp are two condensing lenses 19—19 carried in a separate casing 10 which is slidable in the casing 11 to focus the beam of light. A conical casing 20 is clamped to the lower portion of the condensing lens mounting. The mirror and condensing lenses have the effect of concentrating the light from the lamp 15 in a beam having a focal point somewhat below the level of the paper B.

Just below the orifice 21 of the conical casing 20 is a shutter 22 hung on an arm 23 which extends over the top of the casing 11 and is pivoted as shown at 24—24 on opposite sides thereof. From the arm 23 depends a feeler 25 which is preferably made of wire and has its lower end terminating in a small coil 26. The feeler is long enough so that when there is no paper in the machine and the shutter is in the position shown in Fig. 1, it will extend to a point somewhat below the level of the paper. The shutter structure including the shutter 22, arm 23, feeler 25 and feeler coil 26 is free to swing about the pivots 24. When the paper is inserted in the machine the feeler coil 26 being longer than the distance to the upper surface of the paper, rests on the paper with the feeler structure in an inclined position as shown in full lines in Fig. 2 and the shutter withdrawn from the path of light through the optical unit. However, if the paper breaks the shutter swings back into the path of the beam of light and prevents the projection of the light at full strength into the apparatus which might result in injury.

The lower end of the cone shaped casing 20 is placed at a short distance above the top surface of the paper so as to leave room to replace the paper easily and quickly when it breaks or is cut. To prevent outside light passing into the instrument, I provide a cylindrical tubular member 27, conveniently called a sunshade, mounted on an arm 28 pivoted at 29 so that the sunshade can be swung into or out of position when desired.

By this arrangement the paper can be threaded through the machine after a break without any interference from the measuring apparatus.

Below the paper is a substantially cylindrical housing 30 mounted on a bracket 31 on the post 12 of the apparatus. There is a window opening 32 in the upper part of the housing. A removable slide S with a circular window opening 38 is fitted to the housing 30 over the opening 32 therein. Within this housing is placed a photo-electric cell 33 of any well known construction. In practice I use an exhausted glass bulb within which is a cathode 34 of hollow-spherical form having a sodium surface and an anode 35. The anode and cathode are connected by lead wires 36 and 37 with the electrical part of the apparatus.

A suitable arrangement is provided for preventing the tendency of the paper to flutter. For this purpose in the form illustrated the glass bulb of the photo-electric cell 33 is so located and of such a shape that it projects up through the window 38 in the slide S slightly so that the paper will always be in direct contact with the photo-electric cell. This arrangement is important because in the ordinary paper machine there is a tendency for the paper to flutter as it passes through the machine and that such fluttering would otherwise vary the distance between the paper and the photo-electric cell and cause diffusion of the light. This would vary the amount of light entering the cell and introduce an error into the measurements. By locating the photo-electric cell so that it is always in contact with the paper this error is altogether avoided.

While the electrical apparatus shown in diagram in Fig. 1 constitutes the preferred embodiment of this part of my invention, I do not limit myself to it. The electrical apparatus consists essentially of two parts, first, means for supplying current to the lamp 15 and regulating it so as to produce a beam of light of uniform intensity capable of regulation, and second, means for measuring the variations in a current which varies in accordance with the variations in the light entering the said photo-electric cell.

In the diagram, I have shown two feed wires 40 and 41 which through a transformer 42, the wires 43, 44 supply the lamp 15 with current. In this circuit is a variable resistance 45 and a switch 46, by which the voltage of the current supplied to the lamp may be regulated and consequently the proper intensity of the beam of light produced.

As already stated the lead wires 17—17 are soldered to the lamp 15 to prevent any possible variations in the resistance in this circuit such as might occur if a spring socket were used or from changes in temperature.

The second part of the electrical apparatus comprises essentially means for amplifying the current passing through the photo-electric cell and a meter for measuring variations in current in the circuit. In the drawing, I have shown transformer windings 60 and 61 the primary winding of which is connected with the electrical supply lines 40 and 41. The transformer winding 60 supplies energy to heat the filament 62 of the amplifier 52. The alternating current from the transformer winding 61 is passed through a suitable rectifying device, such as a tube 63, to the meter 50 and plate 65 of the amplifier 52. The cathode 34 and the anode 35 of the photo-electric cell are connected respectively to the grid 64 and plate 65 of the amplifier.

The meter employed has a scale with a center zero point, and on each side is calibrated to record units of thickness of the paper reading to the right and left from the zero point.

In using the hereindescribed apparatus embodying my invention, a sheet of paper of the desired standard density is inserted in the machine and the light 15 turned on by closing the switch 46. The shutter is opened and the apparatus focused to produce a sharp round image on the paper. Thereafter the intensity of the light in the bulb 15 is regulated by means of the rheostat 45 until the needle 51 of the meter 50 is on the zero position. The sheet of standard paper is then removed and the optical instrument is swung into place over the sheet of paper to be measured in the machine. It will be understood that this will ordinarily but not necessarily be a sheet of paper in motion in the paper making machine. As the paper passes through the measuring apparatus, the variations in thickness produce variations in the amount of light which passes through the paper into the photo-electric cell, and consequently variations in the current passing through it. These variations are amplified by the amplifier 52 and cause a corresponding movement of the pointer 51 of the meter 50. If the paper is thinner than the standard sheet, the needle moves to the right while if it is thicker it moves to the left. The minor variations in the thickness of the sheet of paper produce almost constant fluctuation of the needle on opposite sides of a mid-position. If this mid-position corresponds with the zero point on the instrument, the paper is of a true average thickness equal to the thickness of the standard sheet, but if the mid-position is at one side of the zero point the distance of the mid-position from the zero position indicates the amount of variation of the true average thickness from that of the standard required. In Fig. 3 the needle is shown as fluctuated from ten points on the right to thirty points on the left, these being indicated by arrows in dotted lines. The mid-position is halfway between these two positions and is ten points at the left of the zero position. The indicator therefore shows that the true average thickness of the paper is ten points thicker than the standard sheet.

In Fig. 4 the needle is shown as fluctuating from 20 points on the right to 80 points on the right. The mid-position is halfway between these two points and is 50 points to the right of zero. The indicator therefore shows that the true average thickness of the paper is 50 points thinner than the standard sheet. It will be noted that the amplitude of the vibration of the pointer is a measurement of the uniformity of the paper thickness.

I find that in practice the operator of the paper machine soon becomes skilled in observing the fluctuations of the needle and in estimating the mid-position of the fluctuations and thus in estimating the amount by which the paper deviates in thickness from the thickness required. It will also be seen that the apparatus may be quickly and easily adjusted to any desired change in thickness by merely inserting a different standard sheet into the apparatus and varying the resistance 45 until the needle of the meter is again at zero.

What I claim is:

1. Apparatus for measuring variations in the thickness of a sheet of paper, which consists in a lamp, means for concentrating a beam of light therefrom, and for throwing it against a sheet of paper, a photo-electric cell on the opposite side of the sheet of paper, an electric circuit for the photo-electric cell, means for measuring variations in the current in said circuit, and a shutter interposed between the lamp and the photo-electric cell normally intercepting the light from the lamp, and means operated by the paper for holding the shutter out of the path of the lamp.

2. An apparatus for measuring variations of the thickness of paper which consists in enclosed means for throwing a beam of light against the sheet of paper, the orifice of said means being at a distance from the surface of the paper, a photo-electric cell on the opposite side of the sheet of paper, an electric circuit for the cell, means for measuring variations in the current passing through the electric cell, and an opaque tubular member interposed between the orifice of the beam projecting means and the surface of the paper.

In testimony whereof I affix my signature.

FRANK SAWFORD.